(12) United States Patent
Ko et al.

(10) Patent No.: US 7,330,407 B2
(45) Date of Patent: Feb. 12, 2008

(54) METHOD AND APPARATUS FOR ADAPTIVELY ALLOCATING A SPARE AREA IN A RECORDING MEDIUM, AND A RECORDING MEDIUM HAVING A SPARE AREA ALLOCATED USING THE SAME

(75) Inventors: Jung-wan Ko, Gyeonggi-do (KR); Kyung geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 10/657,712

(22) Filed: Sep. 9, 2003

(65) Prior Publication Data
US 2004/0125716 A1   Jul. 1, 2004

(30) Foreign Application Priority Data
Sep. 10, 2002   (KR) ............... 10-2002-0054754

(51) Int. Cl.
*G11B 7/00* (2006.01)
(52) U.S. Cl. ............... 369/47.14; 369/53.15
(58) Field of Classification Search ............ None
See application file for complete search history.

(56) References Cited

U.S. PATENT DOCUMENTS

| | | | |
|---|---|---|---|
| 4,835,757 A | 5/1989 | Abiko | |
| 5,844,911 A | 12/1998 | Schadegg et al. | |
| 6,367,038 B1 | 4/2002 | Ko | |
| 6,385,148 B2 | 5/2002 | Ito et al. | |
| 6,922,802 B2 * | 7/2005 | Kim et al. | 714/723 |

FOREIGN PATENT DOCUMENTS

| | | |
|---|---|---|
| EP | 0350920 A2 | 1/1990 |
| EP | 1 026 681 | 8/2000 |
| GB | 2 332 555 | 6/1999 |
| JP | 2000-20961 | 1/2000 |

OTHER PUBLICATIONS

Examination and Search Report issued on May 30, 2007 by the Malaysian Intellectual Property Office for Malaysian Patent Application No. PI 20033410.

* cited by examiner

*Primary Examiner*—Paul Huber
(74) *Attorney, Agent, or Firm*—Stein, McEwen & Bui, LLP (57) ABSTRACT

A method and apparatus for allocating a spare area to a recording medium, and a recording medium thereof. The method includes recording data in a data area of the recording medium according to a first recording operation, creating information regarding the adjusted spare area size, based on a defect contained in the recorded data, recording the information regarding the spare area and information regarding the defect, in the data recorded according to the first recording operation, as first temporary defect information in the data area, and recording defect management information for managing the first temporary defect information as first temporary defect management information in a temporary defect management information area which is present in at least one of a lead-in area, a lead-out area, and an outer area of the recording medium. Accordingly, a spare area is allocated to a recording medium according to the occurrence rate of defects in the recording medium, resulting in effective use of a data area.

28 Claims, 7 Drawing Sheets

METHOD AND APPARATUS FOR ADAPTIVELY ALLOCATING A SPARE AREA IN A RECORDING MEDIUM, AND A RECORDING MEDIUM HAVING A SPARE AREA ALLOCATED USING THE SAME

CROSS-REFERENCE TO RELATED APPLICATIONS

This application claims the priority of Korean Patent Application No. 2002-54754 filed on Sep. 10, 2002, in Korean Intellectual Property Office, the disclosure of which is incorporated herein in its entirety by reference.

BACKGROUND OF THE INVENTION

1. Field of the Invention

The present invention relates to an allocating of a spare area to a recording medium, and more particularly, to a method and apparatus for allocating a spare area to a recording medium for defect management, and a recording medium thereof.

2. Description of the Related Art

Generally, for defect management purposes, a spare area is allocated to a data area of a recording medium. The allocation of the spare area causes the data area to be divided into a user data area and the spare area. The spare area is an area of the recording medium reserved for use when a defect occurs in the data area. When the defect occurs, user data can be recorded in the spare area, thereby enabling a complete recording of user data to a recording medium.

In general, the allocating, in the recording medium, of the spare area is performed during initialization. A ratio of the spare area to the data area is determined based on a defect rate of a recording medium, the characteristics of data to be recorded, the size of the data area, etc.

However, when defects occur more frequently than expected, the spare area may become entirely filled with data, before completing data recording in the user data area. The exhaustion of the spare area prevents defect management from being performed on the remaining portion of the user data area. In contrast, a large part of the spare area may be left to be unused when defects occur less frequently than expected. In the former case, the size of the spare area, associated with the data area, ends up being excessively small, whereas in the latter case, the size of the spare area ends up being excessively large. For both cases, the data area is not efficiently used.

Defect management can be defined as a rewriting of user data, of a portion of a user data area in which a defect is detected, in a new portion of data area of a recording medium, thereby compensating for a loss in data caused by the defect. In general, defect management is performed using linear replacement or slipping replacement. In linear replacement, a user data area, in which a defect occurs, is replaced with a spare data area having no defects. In slipping replacement, user data recorded in a user data area having a defect is slipped to be recorded in the next user data area having no defects.

Both linear replacement and slipping replacement are applicable only to recording media such as a DVD-RAM/RW on which data can be repeatedly recorded and where recording can be performed using a random access method. It is difficult to apply linear replacement and slipping replacement to a write once recording medium, where recording is allowed only once. In general, the presence of defects in a recording medium is detected by recording data on the recording medium and confirming, based on the recorded data, whether or not data can be recorded on the recording medium. However, once data is recorded on a write once recording medium, it is impossible to overwrite new data and manage defects therein.

Meanwhile, after the development of CD-Rs and DVD-Rs, high-density write once recording media have been introduced, with the high-density write once recording media having a recording capacity of several dozens of giga-bytes (GB). These recording media can be used as backup recording media, since they are not expensive and allow random access which enables fast reading operations. However, defect management is not available for write once recording media. Therefore, a backup operation is discontinued when a defective area, i.e., an area where a defect occurs, is detected during the backup operation, because defect management on a write once recording medium is not performed. In general, a backup operation is performed when a system is not frequently used, e.g., at night when a system manager does not operate the system. In this case, it is more likely that a backup operation is stopped when a defective area of a write once recording medium is detected.

SUMMARY OF THE INVENTION

The present invention provides a method and apparatus for more efficiently allocating a spare area to a recording medium according to an occurrence rate of defects in the recording medium, thus enabling efficient use of a data area, and a recording medium having a spare area allocated thereon using these methods and apparatuses.

The present invention also provides a method and apparatus for allocating a spare area to a write once recording medium according to an occurrence rate of defects in the recording medium, thus enabling efficient use of a data area, and a recording medium having a spare area allocated thereon using these methods and apparatuses.

Additional aspects and/or advantages of the invention will be set forth in part in the description which follows and, in part, will be obvious from the description, or may be learned by practice of the invention.

According to an aspect of the present invention, there is provided a method of allocating a spare area for a recording medium, including recording data in a data area of the recording medium according to a first recording operation, creating information regarding an adjustment of a size of an allocated spare area of the recording medium, based on a defect detected in the recorded data during the first recording operation, recording the information regarding the adjustment of the size of the spare area and information regarding the defect, in the data recorded according to the first recording operation, as first temporary defect information in the data area of the recording medium, and recording defect management information to the recording medium for managing the first temporary defect information as first temporary defect management information in a temporary defect management information area of the recording medium in at least one of a lead-in area, a lead-out area, and an outer area of the recording medium.

There may be a repeating of another recording of data in the data area, a recording of another spare area size adjustment information, a recording of additional defect information, and recording of defect management information on the recording medium, and creating information regarding the additional adjusted spare area size while increasing an index of another recording operation, another temporary defect information area, and the temporary defect management information, by 1, and a recording a lastly recorded temporary defect management information and temporary defect information in a defect management area (DMA) of the recording medium in at least one of the lead-in area, the lead-out area, and the outer area of the recording medium.

The creating of the information regarding the adjustment of the size of the allocated spare area may include calculating an occurrence rate of defects, and creating information regarding the adjustment of the size of the allocated spare area based on the calculated occurrence rate. The creating of the information regarding the adjustment of the size of the allocated spare area based on the calculated occurrence rate may use the occurrence rate of defects and the adjustment of the size of the allocated spare area, or the occurrence rate of defects and a mapping table in which possible positions of the spare area are mapped.

The recording of data in the data area of the recording medium according to the first recording operation may include recording data in predetermined units of data on the recording medium, verifying the recorded data to detect an area of the recorded data in which a defect occurs, storing information designating the area having the defect and subsequent area, in which data is recorded after the area having the defect, as a defective area, in memory, recording data, on the recording medium, after the defective area in predetermined units, and the recording of the adjustment of the size of the allocated spare area and the defect information comprises reading the first temporary defect information from the memory and recording the read first temporary defect information in a first temporary defect information area of the data area on the recording medium.

According to another aspect of the present invention, there is provided a a recording or recording and reproducing apparatus, including a recording/reading unit to record/read data on/from a recording medium, and a controller to control the recording/reading unit to record information, regarding a defect in data recorded in a data area of the recording medium according to a first recording operation, as first temporary defect information in the data area, to adjust a size of a spare area, of the recording medium, based on the defect and to control the recording/reading unit to record information regarding an adjustment of a size of the spare area in a first temporary defect management information area, and to control the recording/reading unit to record defect management information to manage the first temporary defect information area as first temporary defect management information in a temporary defect management information area on the recording medium in at least one of a lead-in area and a lead-out area of the recording medium.

The controller may control the recording/reading unit to record data in the data area while increasing an index of another recording operation, another temporary defect information, and another temporary defect management information, by 1, and control the recording/reading unit to record a lastly recorded temporary defect management information and temporary defect information in a defect management area, on the recording medium in at least one of the lead-in area and the lead-out area of the recording medium.

The controller may calculate an occurrence rate of defects in the data recorded according to the first recording operation and adjusts the adjustment of a size of the allocated spare area based on the calculated occurrence rate.

The controller may control the recording unit to record data in predetermined units of data according to a predetermined recording operation, verifie the recorded data to detect the defect in the recorded data, creating defective area information, used to designate an area of the recording medium having the defect and data recorded after the area having the defect, as a defective area, and store the defective area information as an ith temporary defect information in a memory, control the recording unit to record data in predetermined units of data after the defective area according to the predetermined recording operation, and control the recording/reading unit to read the ith temporary defect information from the memory after completing recording of data according to the predetermined recording operation and record the read data in an ith temporary defect information area of the data area on the recording medium.

According to a further aspect of the present invention, there is provided a write once recording medium having a single record layer in which a lead-in area, a data area, and a lead-out area are sequentially formed, the recording medium including a defect management area on the recording medium in at least one of the lead-in area and the lead-out area, and a temporary defect management information area which is present in at least one of the lead-in area and the lead-out area and in which information regarding a spare area is recorded to enable defect management of the recording medium.

BRIEF DESCRIPTION OF THE DRAWINGS

The above and/or other aspects and advantages of the present invention will become more apparent by describing in detail embodiments thereof with reference to the attached drawings in which.

DETAILED DESCRIPTION OF THE INVENTION

The present invention will now be described more fully with reference to the accompanying drawings, in which embodiments of the invention are shown.

Figure 1:
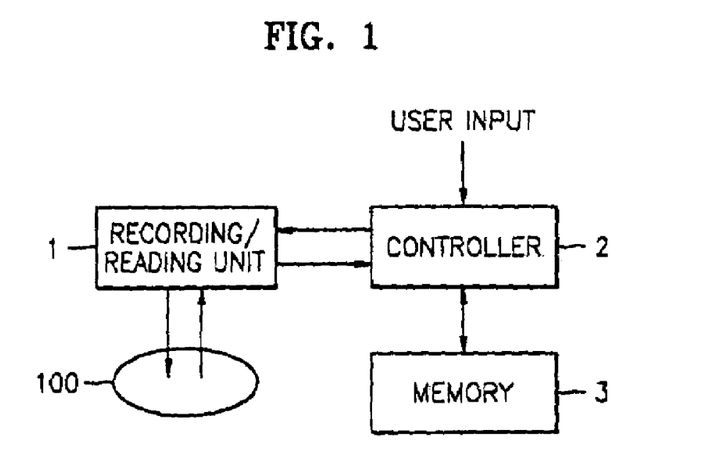
FIG. 1 is a block diagram of a recording apparatus according to an embodiment of the present invention.

FIG. 1 is a block diagram of a recording apparatus according to an embodiment of the present invention. Referring to FIG. 1, the recording apparatus includes a recording/reading unit 1, a controller 2, and a memory 3. The recording/reading unit 1 records data on a recording medium 100, e.g., an optical disc, and reads the data from the recording medium 100 so as to verify the accuracy of the recorded data. The controller 2 performs defect management and allocates a spare area to the recording medium 100 according to an occurrence rate of defects. For instance, the controller 2 increases the size of the spare area in the recording medium 100 when the occurrence rate of defects is larger than a predetermined threshold, and reduces the size of the spare area when the occurrence rate is smaller than the predetermined threshold. Information regarding the adjusted spare area size is recorded in a temporary defect information area of the recording medium 100, explained below in more detail. Here, there is no limit regarding a range of the predetermined threshold. However, the predetermined threshold is generally appropriately determined based on a general occurrence rate of defects.

In this embodiment, the controller 2 uses a verify-after-write method. That is, the controller 2 controls the recording/reading unit 1 to record data in predetermined units and verify the accuracy of the recorded data. Next, the controller 2 creates defect information indicating the position of a defective area of the recording medium 100 and stores it in the memory 3. Every time defect information is created, new defect information is stored in the memory 3. When the amount of the defect information reaches a predetermined level, the controller 2 records the defect information as temporary defect information on the recording medium 100. The controller 2 calculates the occurrence rate of defects and adjusts the size of the spare area based on the calculated occurrence rate. Information regarding the adjusted spare area size is added to the defect information for recording in the temporary defect information area of the recording medium 100. The temporary defect information and management information for managing spare area information are recorded as temporary defect management information on the recording medium 100.

In this embodiment, the adjusted spare area size is periodically recorded in recording operation units. Thus, the spare area information as well as the temporary defect information is periodically recorded in recording operation units. In general, the recording operation is a unit of work determined according to user's intention or a recording work to be performed. According to this embodiment, a recording operation indicates a process in which the recording medium 100 is loaded into the recording apparatus, data is recorded on the recording medium 100, and the recording medium 100 is taken out from the recording apparatus. During the recording operation performed several times, generally data is recorded and verified at least once. Defect information obtained after the verify-after-write method is stored as the temporary defect information in the memory 3.

When a user presses an eject button (not shown), of the recording apparatus, in order to remove the recording medium 100 after recording of data, the controller 2 expects the recording operation to be terminated. Then, the controller 2 adjusts the size of the spare area based on the temporary defect information stored in the memory 3. Further, the controller 2 controls the spare area information and the temporary defect information and the management information, for managing the temporary defect information, to be recorded as the temporary defect management information on the recording medium 100.

If the recording of data on the recording medium 100 is completed, no more data will be recorded on the recording medium 100, i.e., the recording medium 100 is to be finalized, and the controller 2 records the temporary defect information and the temporary defect management information in a defect management area (DMA) of the recording medium 100.

Figure 2A:
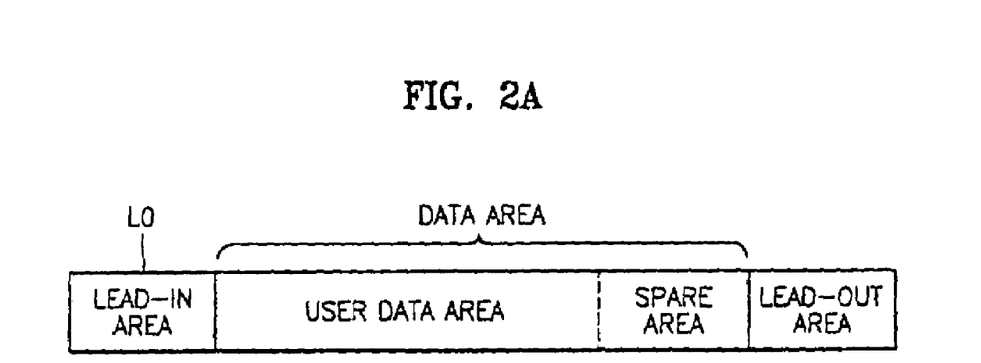
FIGS. 2A and 2B illustrate structures of recording media according to an embodiment of the present invention.

FIGS. 2A and 2B illustrate structures of the recording medium 100 of FIG. 1 according to embodiments of the present invention. In detail, FIG. 2A illustrates the recording medium 100 having a single record layer recording medium with a record layer L0. The recording medium 100 includes a lead-in area, a data area, and a lead-out area. The lead-in area is located in an inner radial portion of the recording medium 100 and the lead-out area is located in an outer radial portion of the recording medium 100. The data area is present between the lead-in area and the lead-out area, and divided into a user data area and a spare area, with the user data area being an area where user data is recorded According to embodiments of the present invention, the size of a spare area is variable because the size can be adjusted based on the occurrence rate of defects in the recording medium 100. The spare area substitutes for the user data area having a defect to ensure that data being recorded to the user data area is not lost, due to the defect. Preferably, the spare area initially amounts to about 5% of the entire data capacity of the recording medium 100, so that more data can be recorded on the recording medium 100. Also, it is preferable that the spare area is located at an end of a recording area of the recording medium 100. Especially, in the case of a write once recording medium, the spare area must be located at an end of a recording area of the recording medium so that slipping replacement is performed while the spare area data is recorded, starting from an inner radial portion toward an outer radial portion of the recording medium 100.

Figure 2B:
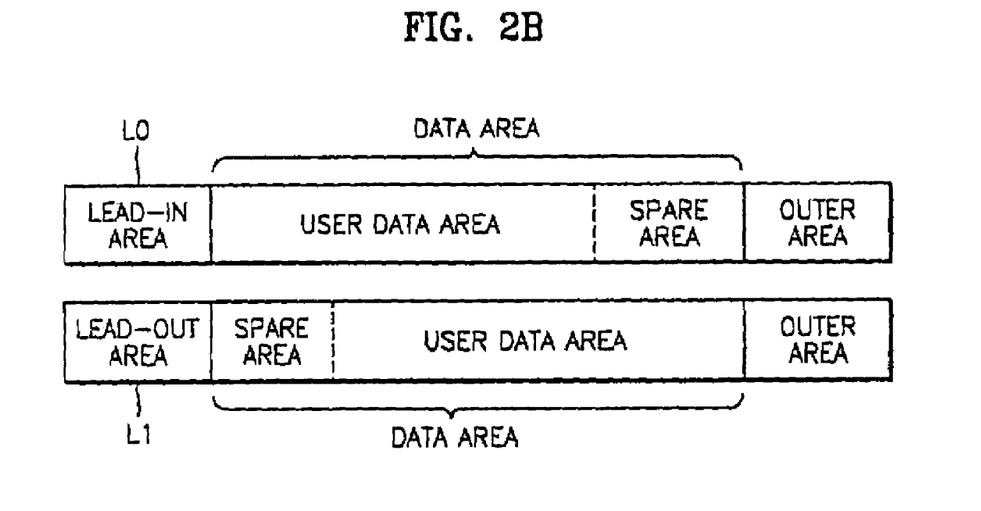

FIG. 2B illustrates a recording medium 100 being a double record layer recording medium with two recording layers L0 and L1. A lead-in area, a data area, and an outer area are sequentially formed from an inner radial portion of the first record layer L0 to an outer radial portion. Also, an outer area, a data area, and a lead-out area are sequentially formed from an outer radial portion of the second record layer L1 to an inner radial portion. Unlike the single record layer recording medium of FIG. 2A, the lead-out area of recording medium 100 in FIG. 2B is present in the inner radial portion of the recording medium 100. That is, the recording medium 100 of FIG. 2B has an opposite track path (OTP) where data is recorded starting from the lead-in area of the first record layer L0 toward the outer area and continues from the outer area of the second record layer L1 to the lead-out area. The respective spare areas are allocated in the first and second record layers L0 and L1. In the recording medium 100 of FIG. 2B, the spare areas are allocated at the end of each recording layer the recording medium 100, in a recording direction, so that their sizes can be changed while data is recorded, when slipping replacement is performed along the OTP.

Figure 3:
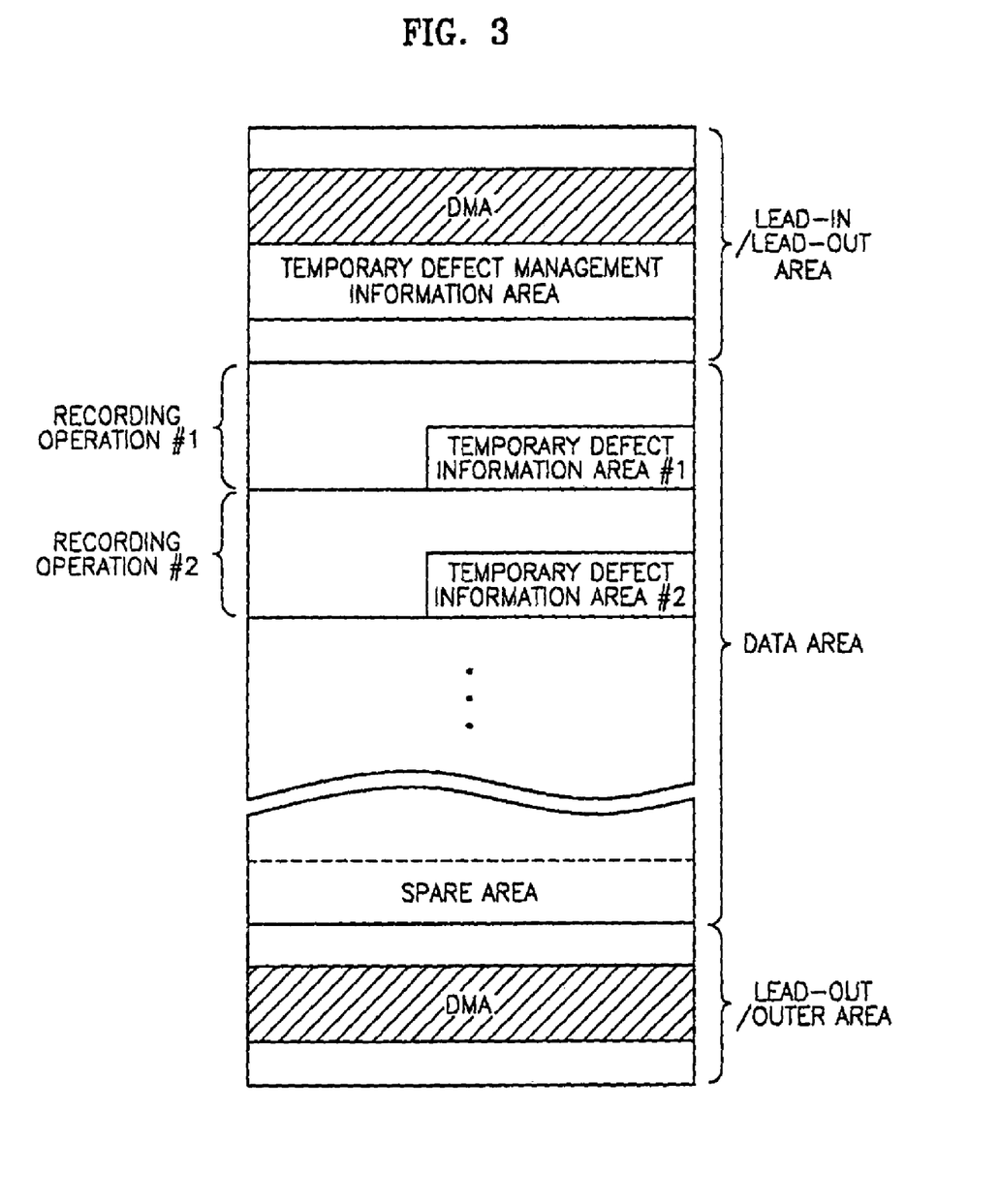
FIG. 3 illustrates structures of the recording media shown in FIGS. 2A and 2B.

FIG. 3 illustrates an example of the structure of the recording medium 100 shown in FIGS. 2A and 2B, according to another embodiment of the present invention. Referring to FIG. 3, a DMA is present in at least one of a lead-in area, a lead-out area, and an outer area of the recording medium 100. Also, a temporary defect management area is formed in at least one of the lead-in area and the lead-out area. During every recording operation, a temporary defect information area is formed in the data area and the size of a spare area is adjusted and re-allocated.

In general, information which relates to managing defects in the recording medium 100 is recorded in the DMA. Such information includes a structure of the recording medium 100 for defect management, the position of defect information, whether defect management is performed or not, and the position and size of a spare area, for example. In the case of a write once recording medium, new data is recorded after previously recorded data when the previously recorded data changes. In general, when a recording medium is loaded into a recording or recording and reproducing apparatus, the apparatus reads data from a lead-in area and a lead-out area of the recording medium to determine how to manage the recording medium and how to record or read data to or from the recording medium. However, if the amount of data recorded in the lead-in area increases, more time will be spent preparing the recording or reproducing of data after loading the recording medium. Accordingly, embodiments of the present invention utilize temporary defect management information and temporary defect information. That is, only the temporary defect management information, which is comparatively more important than the temporary defect information, is recorded in the lead-in area and the temporary defect information is recorded in the data area. Information regarding the spare area is recorded in the temporary defect information area.

It is preferable that new information is added to the previously recorded information in the temporary defect information so that all recorded information is accumulated therein. The recording/reproducing apparatus reads the last recorded temporary defect information to identify defects throughout the recording medium. Thus, information regarding the location of the last recorded temporary defect information is recorded in the temporary defect management information area where the temporary defect management information is recorded.

More specifically, information regarding a defect occurring in the recorded data, and information regarding the size of the spare area, adjusted during recording operation #1, are recorded in temporary defect information area #1. Also, information regarding a defect occurring during recording operation #2, and information regarding the size of the spare area adjusted during recording operation #2, are recorded in temporary defect information area #2. Defect management information for managing temporary defect information areas #1, #2, . . . , #i is recorded in the temporary defect management information area, with i being an integer. If no more data can be recorded on the recording medium 100 or a user does not want to record any more data on the recording medium 100, the recording medium 100 needs to be finalized and the temporary defect information, recorded in the temporary defect information area, and the temporary defect management information, recorded in the temporary defect management information area, are recorded in the DMA. Recording of information regarding the spare area is optional.

The reason for recording the temporary defect management information and the temporary defect information in the DMA, will now be explained. When no more data is to be recorded on the recording medium 100, and the recording medium 100 needs to be finalized, the temporary defect management information, which is updated several times, and the temporary defect information recorded in the data area, are recorded in the DMA of the lead-in area, thereby enabling fast reading of information recorded in the recording medium 100. It is also possible to increase the reliability of reproducing the recorded information by recording the defect management information in a plurality of areas.

In this embodiment, defect information recorded in temporary defect information areas #0 through #i−1 is repeatedly recorded in the subsequent temporary defect information areas. Therefore, it is sufficient to read the defect information from the last temporary defect information area and record the read information in the DMA during the finalizing of the recording medium 100. Meanwhile, it is not preferable to record spare area information recorded in preceding temporary defect information areas #1, #2, #3, . . . , and #i−1 in temporary defect information area #i, because only recently updated spare area information is available.

In the case of a high-density recording medium having recording capacity of several dozens of GB, e.g., high-density blue ray optical disc, it is desirable that a great amount of temporary defect management information #i, which is recorded in the temporary defect management information area and corresponds to temporary defect information area #i, is assigned about 1 cluster, with the size of temporary defect information area #i being set from 4 to 8 clusters. This is because it is preferable to record new information in units of clusters in order to update information when a minimum physical recording unit is a cluster, although the amount of information recorded in temporary defect information area #i is just about several KB. Meanwhile, it is preferable that a total amount of defects allowed in a recording medium be about 5 percent of the recording medium recording capacity. For instance, about 4-8 clusters are required to record temporary defect information #i, considering that information regarding a defect assumes about 8 bytes and the size of a cluster is about 64 KB.

The verify-after-write method can be performed in temporary defect information area #i and temporary defect management information #i. When a defect is detected, information is recorded again in adjacent areas.

Figure 4:
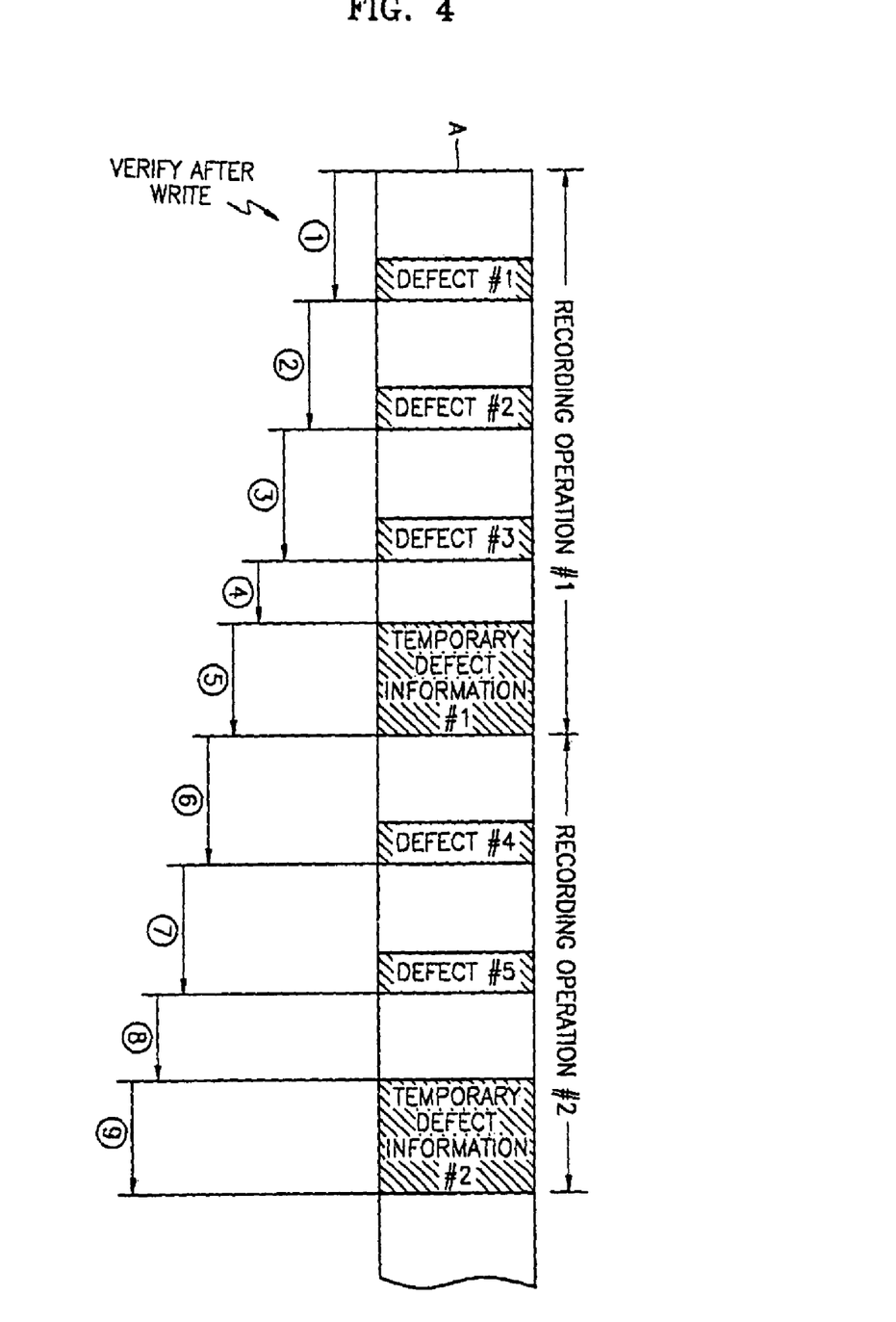
FIG. 4 is a detailed diagram illustrating recording operations according to an embodiment of the present invention.

FIG. 4 is a detailed diagram illustrating recording operations according to an embodiment of the present invention.

In the embodiment represented by FIG. 4, data may be processed in units of sectors or clusters. A sector denotes a minimum unit of data that is managed in a file system of a computer or an application, and a cluster denotes a minimum unit of data that can be physically recorded on a recording medium at one time. In general, one or more sectors constitute a cluster.

There are two types of sectors: a physical sector and a logical sector. The physical sector is an area where a sector of data may be recorded on a recording medium. An address for detecting the physical sector is called a physical sector number (PSN). The logical sector is a sector unit for managing data in a file system or an application recorded in physical sectors on the recording medium, and an address for detecting the logical sector is called a logical sector number (LSN). A recording/reproducing apparatus detects the position of data to be recorded on a recording medium using a PSN. Whole data is managed in units of LSNs in a computer or an application which records data on a recording medium, i.e., the position of data to be recorded is detected using the LSN. The relationship between a LSN and a PSN is controlled by a controller of the recording/reproducing apparatus, based on whether or not a recording medium contains a defect, where the defect is present, and a physical sector number of an initial position of recording data.

Referring to FIG. 4, A denotes a data area in which PSNs have been allocated to a plurality of sectors (not shown) in ascending order. In general, each LSN corresponds to at least one PSN. However, since LSNs are allocated to sectors, except for a defective sector, in ascending order, correspondences between individual PSNs and LSNs are not maintained when a recording medium has a defective area, even if the size of a physical sector is the same as that of a logical sector.

In FIG. 4, data unit sections ① through ⑨ denote a series of recorded units of data, with corresponding verifications being performed after each recording. In detail, a recording apparatus records user data in section ①, returns to the start of section ①, and starts checking if the user data has been appropriately recorded or whether a defect has occurred. If a defect is detected, an area covering the defect and data recorded after the defect in section ① is designated as defect area #1. Next, the recording apparatus records the user data in section ②, returns to the start of section ②, and checks if the user data is appropriately recorded or whether a defect has occurred. If a defect is detected, an area covering the defect and data recorded after the defect in section ② is designated as defect area #2. Likewise, defect area #3 is designated in section ③. However, since a defect is not detected in section ④, a defective area is not designated in section ④.

Because the recording medium 100, according to an embodiment of the present invention, is a write once recording medium, it is desirable that data recorded after an area having a defect is not used and an area covering data recorded after the defect is designated a defective area, as well as the area covering the defect. Assuming that LSN i is allocated to an area where data is recorded, after an area having a defect, in order to use the data, the area where data is recorded after the area having LSN i must be denoted as LSN i-1 for data reproduction. However, if there is a section to which LSNs are not allocated, in ascending order, it is not easy to manage logic sectors. Therefore, in this embodiment, all of data areas after a defective area are also regarded as being defective areas, thereby increasing the efficiency of managing logic sectors.

The size of the spare area is readjusted based on the number of previously detected defects, when recording operation #1 is expected to end, after the recording and verifying of data to the section ④, i.e., when a user presses an eject button of a recording apparatus or recording of user data during recording operation #1 is completed. Information regarding defects #1 through #3, occurring in the sections ① through ④, and spare area informatio recorded in temporary defect information area #1. Thus, temporary defect information area #1 contains information of defective areas for recording operation #1, and information regarding the adjusted spare area size. Further, the size of the spare area is also readjusted in consideration of defects occurring in sections ⑥-⑧, when recording operation #2 is expected to end. Temporary defect information #2 contains information of defective areas for recording operation #2, the information recorded in temporary defect information area #1, and spare area information.

Figure 5:
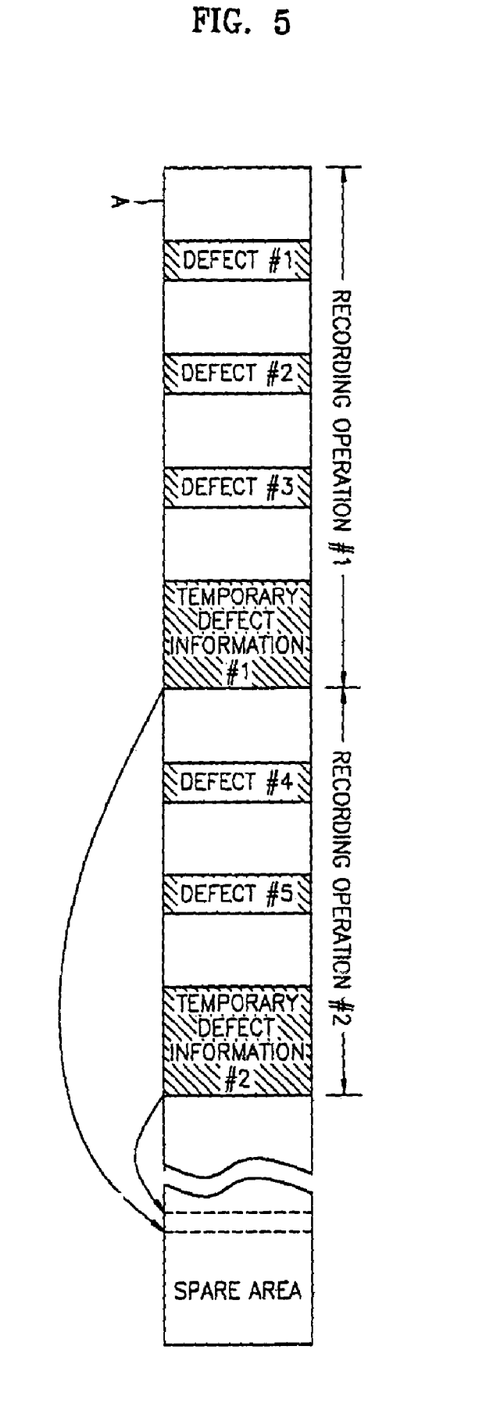
FIG. 5 is a diagram illustrating a relationship between a spare area and spare area information.

FIG. 5 is a diagram illustrating a relationship between a spare area and the spare area information. Referring to FIG. 5, the spare area information is recorded in temporary defect information areas #1 and #2, for example. When recording operation #1 is expected to end, the size of the spare area is adjusted and information regarding the adjusted spare area size is recorded in temporary defect information area #1. The spare area information recorded in temporary defect information area #1 holds information regarding the spare area, the size of which is adjusted. Similarly, the spare area information recorded in temporary defect information area #2 holds information regarding the spare area, the size of which is again adjusted. After termination of recording operation #2, the spare area information is updated and recorded in temporary defect information area #2.

Figure 6A:
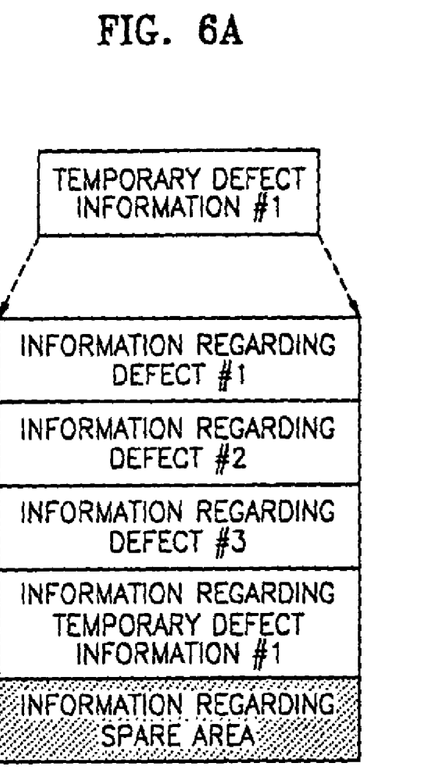
FIGS. 6A and 6B illustrate data structures of temporary defect information #1 and #2 according to an embodiment of the present invention.
Figure 6B:
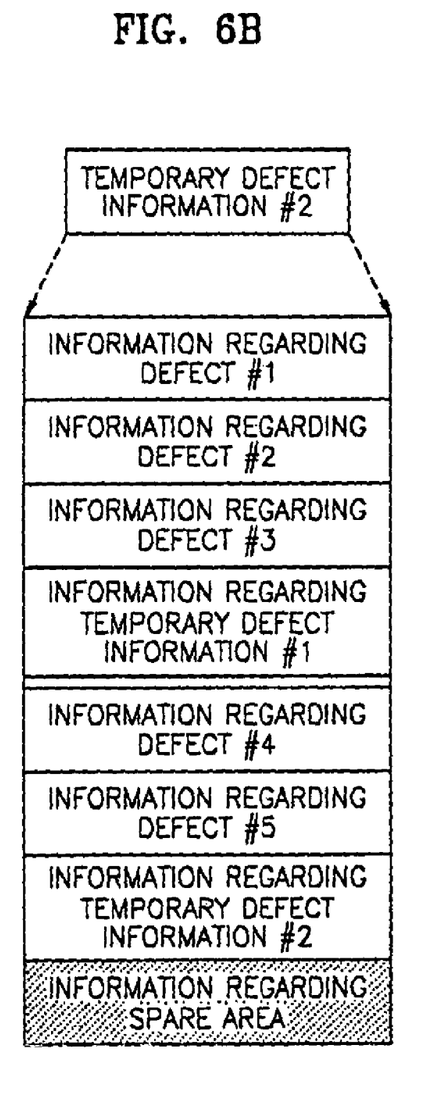

FIGS. 6A and 6B illustrate data structures of temporary defect information #1 and #2 according to embodiments of the present invention. Referring to FIG. 6A, temporary defect information #1 contains information regarding defects #1 through #3. The information regarding the defect #1 describes the position of the defect #1, the information regarding the defect #2 describes the position of the defect #2, and the information regarding the defect #3 describes the position of the defect #3.

Information regarding temporary defect information #1 is further contained in temporary defect information #1. The information regarding temporary defect information #1 includes the position of temporary defect information #1. However, temporary defect information #1 does not contain user data, and thus, it is not reproduced as user data during reproduction of user data. That is, for the reproduction of the user data, it is meaningless to distinguish between defective area #i and temporary defect information #1 because the user data is not contained therein. In conclusion, temporary defect information #1 contains information regarding its position, i.e., information regarding temporary defect information #1, and thus can be used as useful information, for example, to indicate that the information is temporary defect information and not user data.

In addition, information regarding the spare area is contained in temporary defect information #1. The information regarding the spare area provides information regarding the spare area set after termination of recording operation #1, enabling a recording apparatus to detect the position and size of the spare area for recording operation #2.

Referring to FIG. 6B, temporary defect information #2 contains information regarding defects #4 and #5, in addition to the information contained in temporary defect information #1. Temporary defect information #2 also contains information regarding temporary defect information #2, which indicates the position of temporary defect information #2, for the same reason as in temporary defect information #1. Also, spare area information is further contained in temporary defect information #2. The information regarding the spare area provides information regarding the spare area set after termination of recording operation #2, enabling a recording apparatus to detect the position and size of the spare area for a next recording operation.

In this embodiment, information regarding defect #i includes information regarding the state of, e.g., state information, and the starting and ending positions of defect #i. In general, the state information is understood to be flag information that indicates whether a present area is a defective area or an area where temporary defect information is recorded. In the information regarding defect #i, the state information is the flag information which indicates that the present area is a defective area. The information regarding the starting position represents the start of the present area, i.e., the start of the defect #i. The information regarding the ending position represents the end of the present area, i.e., the end of the defect #i. Information regarding temporary defect information #i also includes information regarding the state of and the starting and ending positions of temporary defect information #i. In general, the state information is understood to be flag information that indicates whether a present area is a defective area where a defect occurs or an area where temporary defect information is recorded. In the information regarding temporary defect information #i, the state information is the flag information which indicates that the present area is an area in which temporary defect information is recorded, rather than a defective area.

Figure 7:
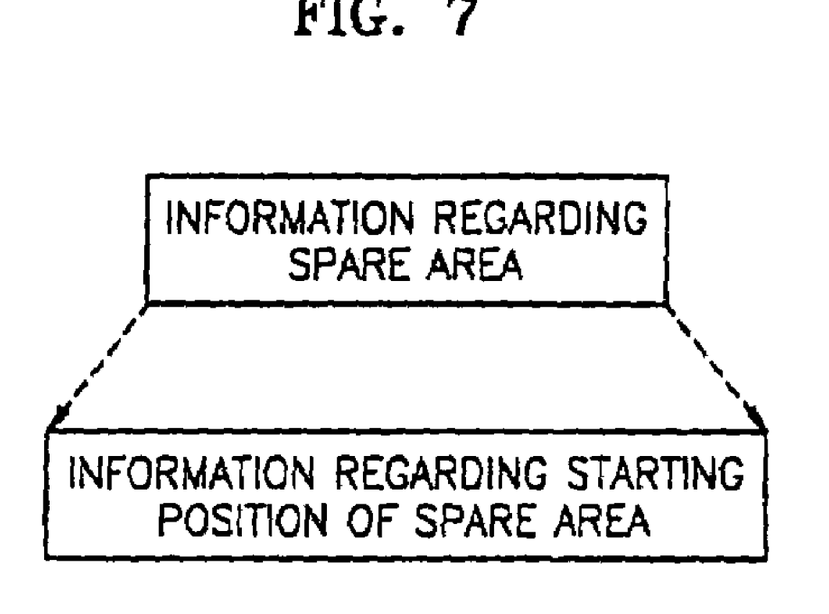
FIG. 7 illustrates a data structure of a spare area according to an embodiment of the present invention.
Figure 8:
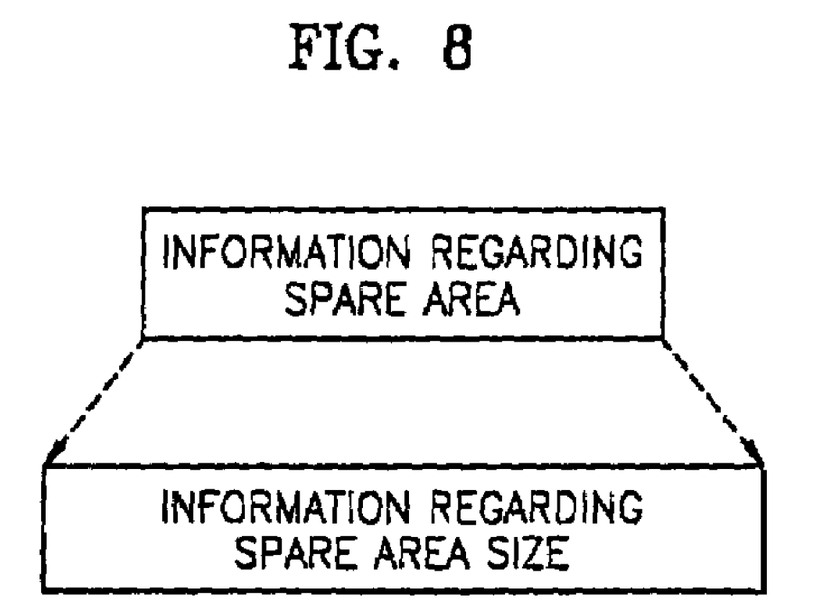
FIG. 8 illustrates a data structure of a spare area according to another embodiment of the present invention.

FIG. 7 illustrates a data structure of a spare area according to an embodiment of the present invention. FIG. 8 illustrates a data structure of a spare area according to another embodiment of the present invention.

Referring to FIG. 7, spare area information indicates a starting position of the spare area. The starting position can be represented with a PSN. Referring to FIG. 8, spare area information indicates a size of the spare area. In this embodiment, since the ending position of the spare area is fixed, it is possible to easily detect the starting position of the spare area based on the information regarding the size of the spare area.

Figure 9:
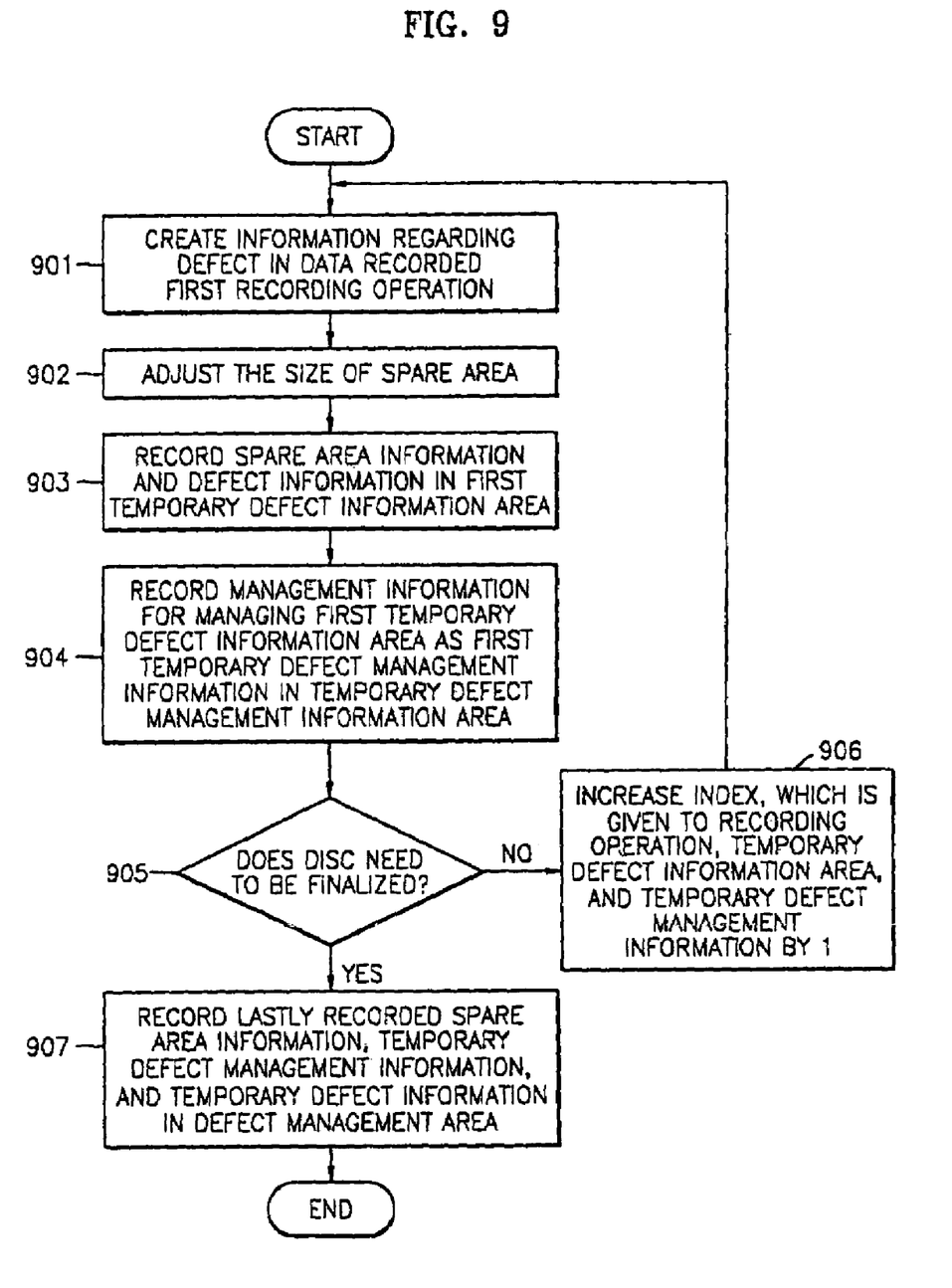
FIG. 9 is a flowchart illustrating a method for allocating a spare area to a recording medium according to an embodiment of the present invention.

FIG. 9 is a flowchart illustrating a method of allocating a spare area in a recording medium according to an embodiment of the present invention. Referring to FIG. 9, in operation 901, a recording apparatus creates information regarding a defect in the data area, which is recorded on the recording medium according to a first recording operation, in order to manage a defect occurring in the recording medium. In operation 902, an occurrence rate of defects is calculated based on the defect in the data recorded, according to the first recording operation, and a size of a spare area is adjusted based on the calculated occurrence rate. Here, the recording apparatus may include a mapping table in which information regarding the sizes (or positions) of the spare area, which correspond to several occurrence rates of defects, is mapped for adjustment of the size of the spare area. In operation 903, the recording apparatus records information regarding the adjusted spare area size, as well as the defect information created in operation 901, in a first temporary defect information area. In operation 904, the recording apparatus records first defect management information for managing the first temporary defect information area in a temporary defect management information area in the recording medium.

Next, it is checked whether the recording medium needs to be finalized, in operation 905. If it is determined that the recording medium does not need to be finalized, operations 901 through 904 are repeated while an index, given to the recording operation, the temporary defect information area, and the temporary defect management information, is increased by 1, in operation 906. In operation 907, if it is determined in operation 905 that the recording medium needs to be finalized, the last recorded temporary defect management information and the corresponding temporary defect information, are recorded in a DMA, and information of the position of the last recorded data is recorded in a data area. That is, the last recorded temporary defect management information and temporary defect information are recorded as the final temporary defect management information and temporary defect information in the DMA. It is preferable that the spare area information is not recorded in the DMA, because the presence of the spare area becomes meaningless once the recording medium is finalized. Instead, information regarding the position of recorded data in a user data area, i.e., PSNs and LSNs, are recorded in the DMA.

The final temporary information and final defect management information may be repeatedly recorded in the DMA so as to increase the reliability of data detection. Further, the verify-after-write method may be performed on the final temporary defect management information and temporary defect information. If a defect is detected from these two pieces of information, an area of the recording medium in which the defect occurs, and data recorded after the area having the defect, may be regarded as being unavailable, i.e., they are designated as a defective area, and the final temporary defect management information and temporary defect information may be again recorded after the defective area.

Meanwhile, in the aforementioned embodiments, the size of a spare area is periodically adjusted per recording operation, but a period of the adjustment is not limited. For instance, the size of the spare area may be adjusted for every other recording operation.

As described above, the present invention provides a method and apparatus that allocate a spare area according to an occurrence rate of defects in a recording medium, resulting in efficient use of a data area, and a recording medium having a spare area thereon using methods and apparatuses of embodiments of the present invention. In particular, defects occurring in write once recording medium can be managed and a spare area can be allocated according to the occurrence rate of defects in a recording medium, whereby a data area can be efficiently used.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of allocating a spare area for a recording medium, comprising:
    recording data in a data area of the recording medium according to a first recording operation;
    creating information regarding an adjustment of a size of an allocated spare area of the recording medium, based on a defect detected in the recorded data during the first recording operation;
    recording the information regarding the adjustment of the size of the spare area and information regarding the defect, in the data recorded according to the first recording operation, as first temporary defect information in the data area of the recording medium; and
    recording defect management information to the recording medium for managing the first temporary defect information as first temporary defect management information in a temporary defect management information area of the recording medium in at least one of a lead-in area, a lead-out area, and an outer area of the recording medium.

2. The method of claim 1, further comprising:
    repeating another recording of data in the data area, a recording of another spare area size adjustment information, a recording of additional defect information, and recording of defect management information on the recording medium, and creating information regarding the additional adjusted spare area size while increasing an index of another recording operation, another temporary defect information area, and the temporary defect management information, by 1; and
    recording a lastly recorded temporary defect management information and temporary defect information in a defect management area (DMA) of the recording medium in at least one of the lead-in area, the lead-out area, and the outer area of the recording medium.

3. The method of claim 2, wherein the recording of the lastly recorded temporary defect management information and temporary defect information is performed after recording data in the data area according to a last recording operation.

4. The method of claim 2, wherein the recording of the lastly recorded temporary defect management information and temporary defect information further comprises recording information regarding position information of recorded data in the data area.

5. The method of claim 4, wherein the recording of the lastly recorded temporary defect management information and temporary defect information further comprises recording at least one of a physical sector number and a logical sector number as the position information.

6. The method of claim 1, wherein the creating of the information regarding the adjustment of the size of the allocated spare area comprises:
   calculating an occurrence rate of defects; and
   creating information regarding the adjustment of the size of the allocated spare area based on the calculated occurrence rate.

7. The method of claim 6, wherein the creating of the information regarding the adjustment of the size of the allocated spare area based on the calculated occurrence rate uses the occurrence rate of defects and the adjustment of the size of the allocated spare area, or the occurrence rate of defects and a mapping table in which possible positions of the spare area are mapped.

8. The method of claim 6, wherein the creating of the information regarding the adjustment of the size of the allocated spare area based on the calculated occurrence rate comprises using information regarding starting position of the spare area to create the adjustment of the size of the allocated spare area.

9. The method of claim 6, wherein the creating of the information regarding the adjustment of the size of the allocated spare area based on the calculated occurrence rate comprises information regarding a size of the spare area as the spare area information.

10. The method of claim 1, wherein the recording of data in the data area of the recording medium according to the first recording operation comprises:
    recording data in predetermined units of data on the recording medium;
    verifying the recorded data to detect an area of the recorded data in which a defect occurs
    storing information designating the area having the defect and subsequent area, in which data is recorded after the area having the defect, as a defective area, in memory;
    recording data, on the recording medium, after the defective area in predetermined units, and
    the recording of the adjustment of the size of the allocated spare area and the defect information comprises reading the first temporary defect information from the memory and recording the read first temporary defect information in a first temporary defect information area of the data area on the recording medium.

11. The method of claim 10, wherein the recording of data in the data area of the recording medium according to the first recording operation further comprises recording, on the recording medium, information designating the first temporary defect information area as a defective area in the first temporary defect information area.

12. The method of claim 1, further comprising:
    repeating a cycling of another recording of data in the data area, a recording of additional defect information, and recording of defect management information on the recording medium for multiple recording operations; and
    alternately recording information regarding additional adjusted spare area size for sequential recording operations.

13. The method of claim 1, wherein the size of the spare area is reduced when an occurrence rate of defects is smaller than a predetermined threshold.

14. The method of claim 1, wherein the size of the spare area is increased when an occurrence rate of defects is greater than a predetermined threshold.

15. A recording or recording and reproducing apparatus, comprising:
    a recording/reading unit to record/read data on/from a recording medium; and
    a controller to control the recording/reading unit to record information, regarding a defect in data recorded in a data area of the recording medium according to a first recording operation, as first temporary defect information in the data area, to adjust a size of a spare area, of the recording medium, based on the defect and to control the recording/reading unit to record information regarding an adjustment of a size of the spare area in a first temporary defect management information area, and to control the recording/reading unit to record defect management information to manage the first temporary defect information area as first temporary defect management information in a temporary defect management information area on the recording medium in at least one of a lead-in area and a lead-out area of the recording medium.

16. The apparatus of claim 15, wherein the controller controls the recording/reading unit to record data in the data area while increasing an index of another recording operation, another temporary defect information, and another temporary defect management information, by 1, and controls the recording/reading unit to record a lastly recorded temporary defect management information and temporary defect information in a defect management area, on the recording medium in at least one of the lead-in area and the lead-out area of the recording medium.

17. The apparatus of claim 15, wherein the controller calculates an occurrence rate of defects in the data recorded according to the first recording operation and adjusts the adjustment of a size of the allocated spare area based on the calculated occurrence rate.

18. The apparatus of claim 15, wherein the controller creates information regarding the adjustment of a size of the allocated spare area, based on an occurrence rate of defects and the spare area size, or the occurrence rate of defects and a mapping table in which possible positions of the spare area are mapped.

19. The apparatus of claim 15, wherein the controller creates a starting position information of the spare area as spare area information.

20. The apparatus of claim 15, wherein the controller creates information regarding a size of the spare area as spare area information.

21. The apparatus of claim 15, further comprising memory, and
    wherein the controller controls the recording unit to record data in predetermined units of data according to a predetermined recording operation, verifies the recorded data to detect the defect in the recorded data, creating defective area information, used to designate an area of the recording medium having the defect and data recorded after the area having the defect, as a defective area, and stores the defective area information as an ith temporary defect information in the memory, controls the recording unit to record data in predetermined units of data after the defective area according to the predetermined recording operation, and controls the recording/reading unit to read the ith temporary defect information from the memory after completing recording of data according to the predetermined recording operation and record the read data in an ith temporary defect information area of the data area on the recording medium.

22. The apparatus of claim 15, wherein:
the controller repeats a cycling of another recording of data in the data area, a recording of additional defect information, and recording of defect management information on the recording medium for multiple recording operations; and
the controller alternately records information regarding additional adjusted spare area size for sequential recording operations.

23. The apparatus of claim 15, wherein a size of the spare area is reduced when an occurrence rate of defects is smaller than a predetermined threshold.

24. The apparatus of claim 15, wherein a size of the spare area is increased when an occurrence rate of defects is greater than a predetermined threshold.

25. A write once recording medium having a single record layer in which a lead-in area, a data area, and a lead-out area are sequentially formed, the recording medium comprising:
a defect management area on the recording medium in at least one of the lead-in area and the lead-out area; and
a temporary defect management information area which is present in at least one of the lead-in area and the lead-out area and in which information regarding a spare area is recorded to enable defect management of the recording medium.

26. The recording medium of claim 25, wherein information indicating a position of user data in the data area, is recorded in the defect management area.

27. A write once recording medium having a single record layer in which a lead-in area, a data area, and a lead-out area are sequentially formed, the recording medium comprising:
a defect management area on the recording medium in at least one of the lead-in area and lead-out area; and
a temporary defect management information area which is present in at least one of the lead-in area and the lead-out area and in which information regarding a starting position of a spare area is recorded to enable defect management of the recording medium.

28. A write once recording medium having a single record layer in which a lead-in area, a data area, and a lead-out area are sequentially formed, the recording medium comprising:
a defect management area on the recording medium in at least one of the lead-in area and lead-out area; and
a temporary defect management information area which is present in at least one of the lead-in area and the lead-out area and in which information regarding a size of a spare area is recorded to enable defect management of the recording medium.

\* \* \* \* \*